United States Patent Office.

ROBERT H. THOMPSON, OF BROOKLYN, NEW YORK.

FABRIC FOR DECORATION.

SPECIFICATION forming part of Letters Patent No. 311,388, dated January 27, 1885.

Application filed October 6, 1884. (Specimens.)

*To all whom it may concern:*

Be it known that I, ROBERT H. THOMPSON, of Brooklyn, in the county of Kings and State of New York, have invented a certain new and useful Improvement in Fabrics for Decoration, of which the following is a specification.

The object of my improvement is to produce an article for decorative purposes which may be applied to walls and ceilings; and the improvement consists, essentially, in a novel method of combining paper, cloth, or similar material with granulated cork, spangle, glass, paint, or analogous decorative substances.

The method which I have found best adapted for carrying out my improvement is as follows: I take paper, cloth, or similar material, apply to one side thereof a coating of glue, paste, or other adhesive substance by means of a brush or otherwise. I next take granulated cork of any desired degree of fineness, and apply a layer thereof to the adhesive substance while the latter is yet wet. When the cork or adhesive substance has become "set" and dry, I preferably apply a coating of glue, paste, or other adhesive substance upon the said layer of cork, and while said adhesive substance is yet wet I apply thereon spangle, granulated glass, colored powder, or flock, by sifting or otherwise. The adhesive substance causes the spangle or glass to adhere firmly to the granulated cork. The whole is then allowed to dry and become firm. I may, if desired, apply a coating of shellac or analogous material to said spangle or glass after the same has been secured to the cork, as above described, by which means the luster of the spangle or glass may be preserved. In some cases I may combine the spangle, glass, or colored powder, and apply the resultant mixture as a paint directly to the cork, or I may use an ordinary paint directly upon it. The use of cork causes a greater roughness of the surface, cork producing large projections, upon which the spangle, glass, or other decorative material presents the appearance of numerous facets. Cork also affords an elastic surface, which is desirable, and its color, if left exposed, contrasts with the spangle or glass. Very unique and pleasing effects can be produced by this means, as I may use spangles, glass, powder, or paint of various colors, and may, if desired, arrange the same in fanciful designs.

What I claim as my invention, and desire to secure by Letters Patent, is—

1. The method of manufacturing an article for decorative purposes, consisting in taking cloth, paper, or an analogous material, applying thereto a coating of glue, paste, or other adhesive substance, applying granulated cork to said adhesive substance, next applying upon said granulated cork a coating of glue, paste, or other adhesive substance, and subsequently applying to said adhesive substance spangle, glass, or other decorative substance, substantially as described.

2. As an article of manufacture, the combination, with paper, cloth, or analogous material, of granulated cork applied thereto, and spangle, glass, powder, or paint applied to said cork, substantially as specified.

ROBERT H. THOMPSON.

Witnesses:
T. J. KEANE,
W. G. LIPSEY.